Jan. 4, 1966 O. F. SMITH 3,226,855
EARTH DIGGING AND TRENCHING SCREW
Filed March 27, 1963 2 Sheets-Sheet 1

INVENTOR.
OPTON F. SMITH
BY Oldham & Oldham
ATTYS.

Jan. 4, 1966  O. F. SMITH  3,226,855
EARTH DIGGING AND TRENCHING SCREW
Filed March 27, 1963  2 Sheets-Sheet 2
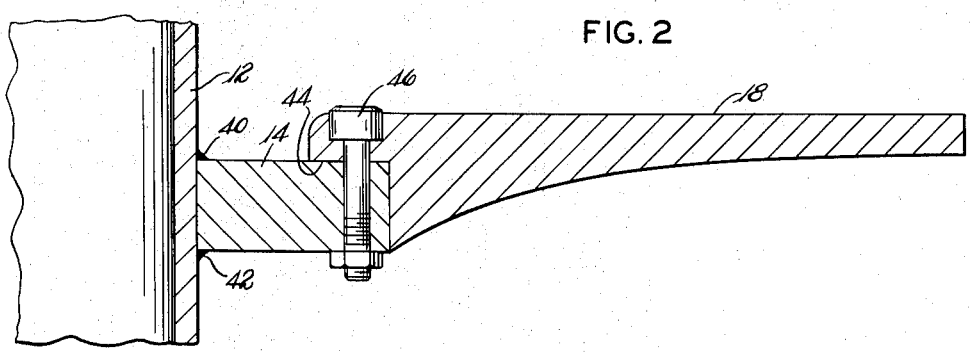
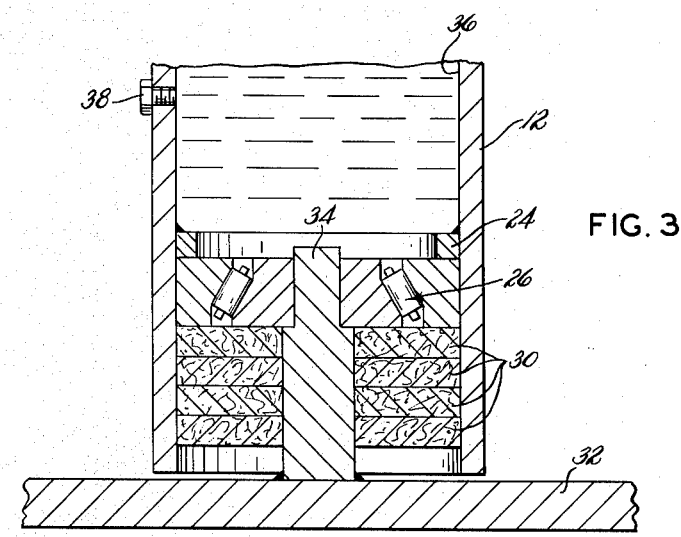
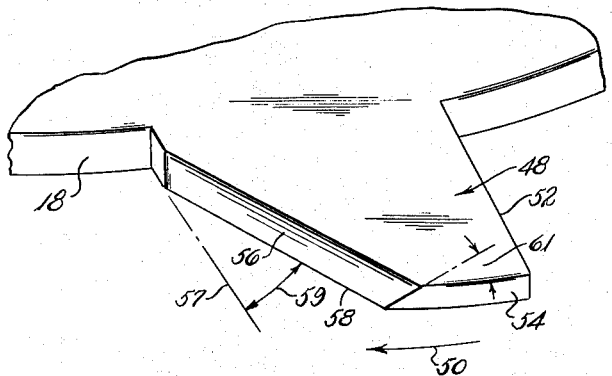
INVENTOR.
OPTON F. SMITH
BY
ATTYS.

United States Patent Office 3,226,855
Patented Jan. 4, 1966

3,226,855
EARTH DIGGING AND TRENCHING SCREW
Opton F. Smith, 4810 Fruitville Road, Sarasota, Fla.
Filed Mar. 27, 1963, Ser. No. 268,420
5 Claims. (Cl. 37—81)

This invention relates to large helically wound screws for trenching, digging, and lifting earth, and more particularly is adapted to provide screws for use in my co-pending application for ditch digging and cleaning apparatus, filed Jan. 2, 1963, Serial No. 249,003.

Heretofore much difficulty has been experienced with screws used with a ditch digging and cleaning apparatus, particularly when operating in ground having a heavy concentration of sand, rocks, roots and the like. The screws used in the present art for ditch digging simply do not stand up to the punishment received, do not provide the necessary cutting action, become clogged in vegetation, or are easily worn down. For example, a single day's run can wear the screw flights down to the shaft in prior art structures. Known structures also do not provide satisfactory means for cutting through roots and vegetation. Replacement of worn flights and screws has been a problem, and ditching machines have had more repair time than operative time.

It is the general object of the invention to avoid and overcome the foregoing and other difficulties of and objections to prior art practices by the provision of a screw for combination with a ditch digging and cleaning apparatus that has relatively long life, excellent cutting action, good lifting and discharging action, and is readily serviced.

Another object of the invention is to provide cutting teeth on the screw flights of a bladed cutting edge that are substantially self sharpening, and which provides good cutting action on the usual materials encountered as the digging and cleaning apparatus moves down a ditch with a minimum of clogging or mechanical failure of the apparatus.

Another object of the invention is to provide a screw wherein the teeth are cast as an integral part of a helical screw sector and which cast unit is then hardened by suitable heat treating to a very high Brinell hardness to thereby make the sector rigid, durable, and capable of properly performing even in rocks and sand with a minimum of wear.

Another object of the invention is to provide a screw wherein the cast helical screw sectors are removably fastened by bolt means to helically positioned flanges welded to the screw shaft permitting simple screw sector removal and renewal to thereby reduce maintenance and upkeep costs.

Another object of the invention is the provision of a screw for a ditching apparatus together with means for lubricating the outboard bearing thereof.

Another object of the invention is to provide a screw of the character described wherein teeth which are cast as an integral part of the helical screw sector, when worn down, can be replaced by new teeth which can be welded in place of the worn down teeth to thereby further reduce maintenance and upkeep costs.

The aforesaid objects of the invention, and other objects which will become apparent as the description proceeds, are achieved by providing a screw having a long hollow shaft, two flanges helically wound around the length of the shaft, welded thereto, and extending radially outwardly therefrom, a plurality of cast metallic helically shaped screw sectors being affixed by screw means at their radially inward edges to the flanges, a plurality of teeth on the outer periphery of each sector, each tooth lying substantially in the plane of the sector, the trailing edge of each tooth being substantially radial, the front edge of each tooth sloping backwardly and outwardly from a radius and being formed with a bevel terminating in a cutting edge in the direction of screw travel, and with each sector being made of a high grade steel alloy and being hardened to a high Brinnel hardness.

For a better understanding of the invention reference should be had to the accompanying drawings, wherein:

FIGURE 2 is an enlarged fragmentary cross sectional view of the shaft flange and blade section taken on line 2—2 of FIGURE 1;

FIGURE 3 is an enlarged vertical cross sectional view of the bottom plate of the support apparatus and bearing of the screw taken on line 3—3 of FIGURE 1; and FIGURE 4 is an enlarged perspective view of one tooth showing the tooth construction and the cutting angle on the leading edge thereof.

Figure 1:
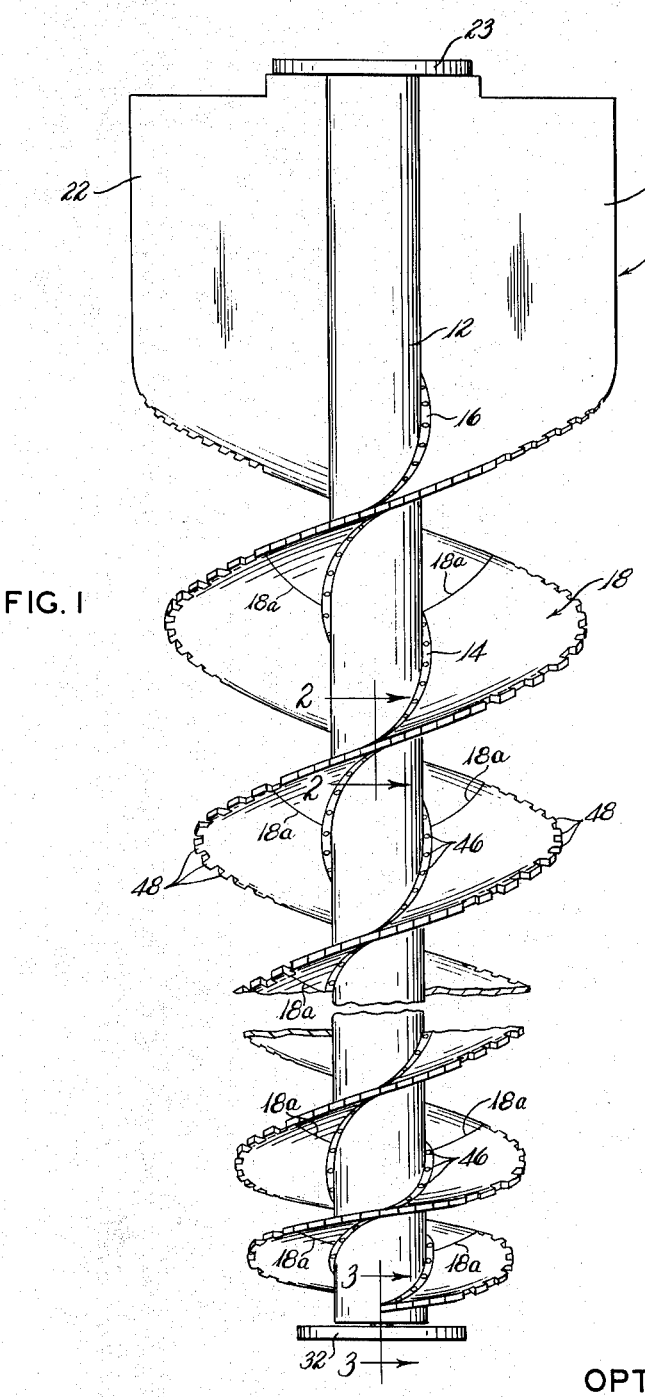
FIGURE 1 is a side elevation of a screw constituting one best known embodiment of the invention.

With specific reference to the form of the invention illustrated in the drawings, the numeral 10 indicates generally a screw including a hollow cylindrical shaft 12 to which is welded a pair of helical flanges 14 and 16 which form the anchoring base for cast helical screw sections 18. These screw sections, together with the flanges, form a double flight screw terminating in radial paddles 20 and 22 at the top of the screw 10. The paddles 20 and 22 serve to laterally discharge the earth raised by the screw, all as more particularly described in the above identified co-pending application. The screw 10 is provided at its top with a circular mounting and driving flange 23 which is usually welded to the top of the shaft 12 and to paddles 20 and 22.

The screw 10 is normally journalled in a roller bearing 26 at its bottom extremity on support plate 32. The mounting structure is best shown in FIGURE 3, where the hollow shaft 12 has a shoulder ring 24 around its inner peripherial surface a short distance from the end of the shaft 12 engaging the roller bearing 26. The bottom support plate 32 has welded to it a vertically extending shouldered bearing pin 34 which engages the central opening through the bearing 26. A series of pack rings 30 are positioned between the pin 34 and shaft 12 to thereby insure a fluid tight seal of the end bearing unit. Preferably, the hollow center 36 of the shaft 12 is filled usually to the top with oil to thereby provide a proper lubricant to the bearing 26. The oil can be introduced into cavity 36 usually from the top but a removable screw plug 38 is provided in the shaft 12 just above the bearing 26 for oil drainage or checking.

The advantage of the structure described is that excellent lubrication is provided on the bearing and a fluid pressure head is created by the oil on the inside of the seal which substantially counterbalances the fluid pressure on the outside of the seal produced when the screw is operated in a drainage ditch or the like full of water.

With specific reference to FIGURE 2, the helical flange 14 is welded as at 40 and 42 to the shaft 12. The cast helical screw sector 18 has a widened root or base with rabbet groove 44 therein which is adapted to fit to the outward edge of the flange 14. The widened root of the screw sector 18 is about twice the width of its radially outward surface. To make the screw sectors 18 removable they are attached as by bolts 46 to the flange 14. The heads of the bolts 46 are normally received in complementary shaped sockets to bury the heads and save them from wear and to keep them from turning.

Usually each of the flanges 14 and 16 are made from a continuous strip of metal while the screw sectors 18 are cast in sectors extending approximately 120° of the circumferential distance around the shaft 12. It has been found that by casting the sectors 18 from a high grade hard alloy steel followed by heat hardening a very high Brinell hardness can be given to the teeth and blade portion such as a Brinell hardness from about 350 to about 400. The construction of the flange 16 and its associated screw is similar to flange 14 and its screw and will not be described in detail. Suffice it to say that the two flights of the screw are 180° apart and provide, in effect, a double thread on the screw to enhance the dirt lifting action of the screw.

The screw thus produced is extremely rugged and durable, is comparatively inexpensive to produce, and can be easily rebuilt.

Having reference to FIGURE 4, this shows a typical tooth 48 on sector 18. In operation the tooth 48 and the sector 18 rotate in the direction of the arrow 50. The trailing edge 52 of the tooth is substantially radial, and the outer edge 54 is substantially circumferential. The leading edge 56 of the tooth slopes backwardly and outwardly from a radius 57 and is formed with a bevel terminating in a cutting edge 58 on the bottom side of the tooth 48. The beveled leading edge tends to be self sharpening as it passes through the earth effecting a wiping and sharpening action between the tooth blade and the earth.

The angle 59 from the radius that the leading edge slopes backwardly from is usually between 20–45°. It has been found that the cutting capacity of the blade diminishes rapidly outside these limits. It has also been found that a smaller angle gives better cutting ability in grass and sod whereas a larger cutting angle gives better cutting ability for roots and stony or rocky soil.

The angle 61 of the bevel is usually between 30° to 60° from the vertical, and again is dependent on the soil conditions where the screw will be used. A smaller bevel angle tends to give better cutting for roots and rocky soil whereas the larger angle is better for grass and sod.

Therefore, the cutting angle and the bevel angle on the leading edge of each tooth are important and dependent on the soil and condition of the ditch where the auger will be used. Thus, a small bevel angle and a larger cutting angle would be best for heavy roots or rocky soil whereas a larger bevel angle and a smaller cutting angle is better for grass and sod.

In the screw 10 as presently designed for use with the ditch digger and cleaning apparatus the screw normally is between 30 to 36 inches in diameter with the length being about 9 to 11 feet. The screw preferably increases in diameter and pitch upwardly thereof. The teeth 48 as best seen in FIGURE 1 are preferably between about 2 to 4 inches wide in a circumferential direction, are between about 2 to 4 inches in a radial dimension, and with about 1 to about 3 inches between the teeth. The teeth are cast integrally with each sector and lie in the plane of the portion of the sector to which they are joined. The leading edge 56 of each tooth may be ground to sharpness after casting.

In actual practice it has been found that when using a high grade alloy steel properly hardened that the teeth are quite rugged and durable and give a useful and long wear life. However, when the teeth do wear down or possibly break off it is a relatively simple process to simply weld new teeth into place on the radially outer peripheral edge of the sectors 18. Also, it is a relatively simple matter to remove the bolts 46 holding the sectors 18 in place and replace a broken or cracked sector, or to replace a sector whose teeth are badly worn or which sector is badly worn. It is the usual practice to weld the edges of adjacent sectors 18 together as at 18a in FIGURE 1 after the sectors are bolted in place with the welded section extending from the radially outer edge inwardly to a point just outside of the flanges 14 and 16. This in no way hampers the removal of any individual sector 18 as this weld can easily be cut with an oxy-acetylene torch or other suitable means when it is desirable for the sector to be removed.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. A screw for digging ditches and the like including a rotatable shaft, a pair of flanges helically wound at diametrically opposed positions around the length of the shaft and being welded thereto, a plurality of screw sectors removably affixed to said flanges, each said screw sector comprising a portion of the circumferential arc around the shaft but together forming a complete screw flight, a plurality of teeth on the outer periphery of each sector, each tooth lying substantially in the plane of the sector, the trailing edge of each tooth lying substantially on a radius of the shaft, the radially outer edge of each tooth lying substantially on a circumference with relation to the shaft, the front edge of each tooth sloping from the root backwardly and outwardly from a radius of the shaft away from the direction of tooth movement upon rotation of the shaft, and said leading edge being formed with a bevel from the top surface forwardly to the bottom surface of the tooth and terminating in a cutting edge at the bottom tooth surface, said teeth and sectors having a Brinell hardness in excess of about 350.

2. A ditch digging screw having a central shaft capable of rotation, a screw flight secured thereto, a plurality of teeth on the outer periphery of the screw, each tooth lying substantially in the plane of the sector, the trailing edge of each tooth lying substantially on a radius of the shaft, the radially outer edge of each tooth lying substantially on a circumference with relation to the shaft, the front edge of each tooth sloping from the root backwardly and outwardly from a radius of the shaft away from the direction of tooth movement upon rotation of the shaft, and said leading edge being formed with a bevel from the top surface forwardly to the bottom surface of the tooth and terminating in a cutting edge at the bottom tooth surface.

3. In a screw, a double screw flight capable of rotation, a plurality of teeth formed integrally on the outer periphery of each screw flight with each tooth lying substantially in the plane of the flight, the radially outer edge of each tooth lying substantially on a circumference with relation to the double screw flight, the front edge of each tooth slanting from the radially inner edge thereof away from the direction of rotation backwardly and outwardly from a radius of the double screw flight, and said front edge being formed with a bevel terminating in a cutting edge.

4. A screw for digging or cleaning ditches and including an elongated hollow shaft, a screw flight on the shaft, a support pin extending into the lower end of the shaft, a bearing carried by the pin and engaging the inside of the shaft, packing means sealing between the pin and the shaft outside the bearing in the lower end of the shaft, and a stand of lubricating oil in the shaft above the bearing substantially the full length thereof in contact with the bearing and pin for lubrication thereof, said stand of oil being of a length for substantially counterbalancing any fluid pressure applied to the packings when the lower end of the screw is positioned for use into a ditch full of water.

5. In a screw for use in a ditch digging or cleaning apparatus the combination of a cylindrically shaped, integral metallic screw shaft, a plurality of metallic flanges helically wound around the length of the shaft, welded thereto, and extending radially outwardly therefrom, a plurality of cast metallic helically shaped screw sectors, bolt means at the radially inward edges of the sectors securing the sectors to said flanges, each screw sector being welded at its ends to the adjacent screw sectors, said welds extending from the radially outer edge of said screw sectors to a point slightly radially outwardly from said flanges, each screw sector having a widened root at the radially inward edge of at least twice the thickness of its radially outer surface, said flanges being at least twice the thickness of the radially outer surface of the screw sectors, and a plurality of integrally cast teeth on the radially outer edges of said screw sectors.

References Cited by the Examiner
UNITED STATES PATENTS

| | | | |
|---|---|---|---|
| 530,687 | 12/1894 | Hanneborg | 37—81 |
| 814,982 | 3/1906 | Nixon | 37—81 |
| 1,368,189 | 2/1921 | Newark | 299—87 |
| 1,642,958 | 9/1927 | Joyner | 308—231 X |
| 2,201,159 | 5/1940 | Clow | 175—394 |
| 2,381,689 | 8/1945 | Roehr | 37—81 |
| 2,417,313 | 3/1947 | MacKinnon | 37—81 |
| 2,555,358 | 6/1951 | Monnia | 308—228 X |
| 2,610,739 | 9/1952 | Bitzer | 198—213 X |
| 2,967,701 | 1/1961 | Wilcox | 299—87 |
| 3,128,998 | 4/1964 | Sibley | 299—87 |

FOREIGN PATENTS 132,015    4/1949    Australia.

BENJAMIN HERSH, *Primary Examiner.*

CHARLES E. O'CONNELL, *Examiner.*